said heaters and means for controlling the flow of water through said supplies comprising means for varying the back pressures of said heaters on said supplies so as to substantially equalize said back pressures under all conditions and maintain constant relative flows to the different heaters.

8. In a fluid distributing system for a plurality of heaters the combination with a plurality of supply passages one for each heater, of means for producing an entering jet within each of said passages, and a common connection between said passages for equalizing the back pressures on said entering jets.

9. In a fluid distributing system for a plurality of heaters, the combination with a single supply source for all of the heaters, of a plurality of distributing pipes directly connected thereto, means in each of said pipes for producing an entering jet, and a common passage connecting all of said pipes to equalize the back pressures on the entering jets.

10. In a fluid distributing system for a plurality of heaters, the combination with a single supply source for all of the heaters, of a plurality of distributing pipes directly connected thereto, means in each of said pipes for producing an entering jet, and a common passage connecting all of said pipes to equalize the pressures on the jet producing means.

11. The combination with a plurality of heaters, of liquid supply pipes for said heaters, apertured diaphragms for controlling the flow within each of said pipes, and a connecting passage between said pipes for equalizing the back pressures on said diaphragms.

12. The combination with a plurality of heaters, of liquid supply pipes for said heaters, apertured diaphragms for controlling the flow within each of said pipes, a connecting passage between said pipes for equalizing the back pressures on said diaphragms, and a second passage between said pipes for equalizing the pressures on said diaphragms.

13. The combination with a plurality of feed water heaters arranged in parallel to discharge into a common suction main, of a cold water supply pipe for each heater, an apertured diaphragm in each supply pipe, and a pressure equalizing connection between said pipes.

In testimony whereof I affix my signature, in presence of two witnesses.

JOHN H. LAWRENCE.

Witnesses:
  WM. S. MORRISON,
  WALTER M. KEENAN.

S. H. LEMON.
DESK ATTACHMENT FOR SUPPORTING TYPE WRITERS.
APPLICATION FILED SEPT. 12, 1917.
1,318,677.
Patented Oct. 14, 1919.
2 SHEETS—SHEET 1.
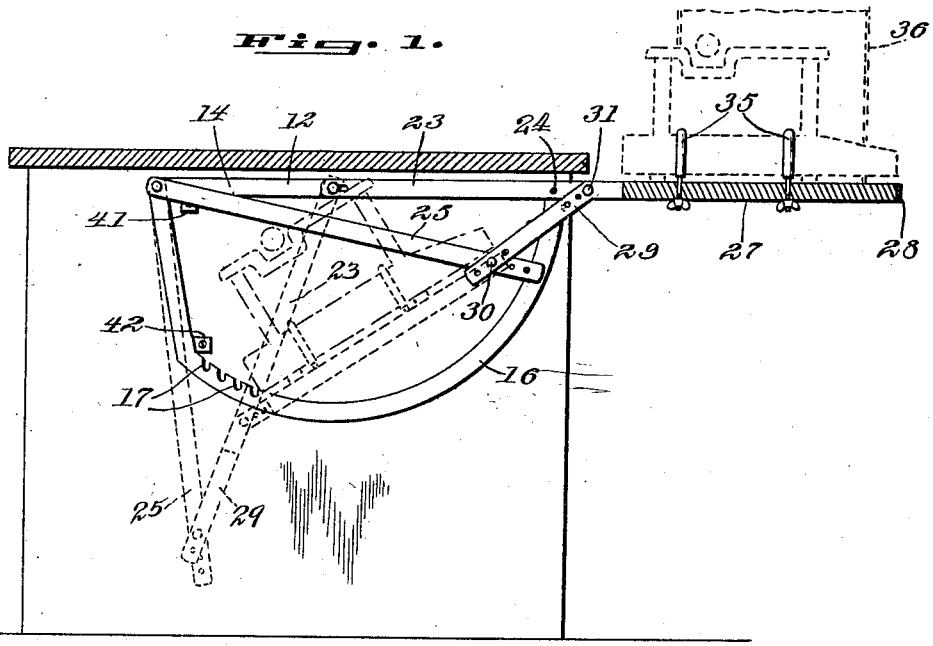
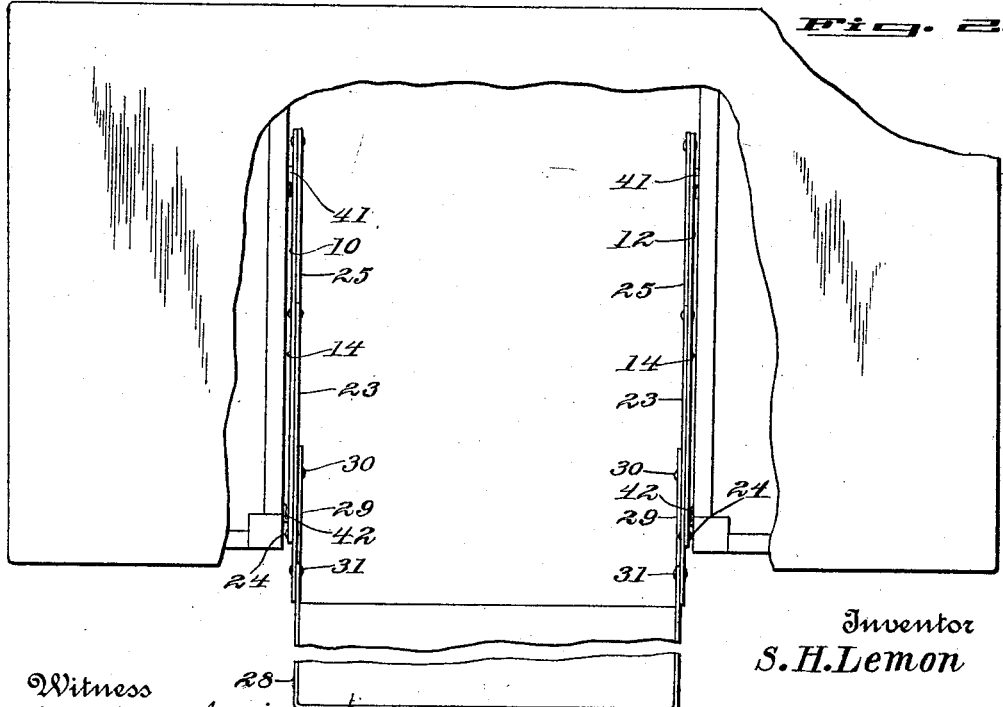

S. H. LEMON.
DESK ATTACHMENT FOR SUPPORTING TYPE WRITERS.
APPLICATION FILED SEPT. 12, 1917.
1,318,677.
Patented Oct. 14, 1919.
2 SHEETS—SHEET 2.
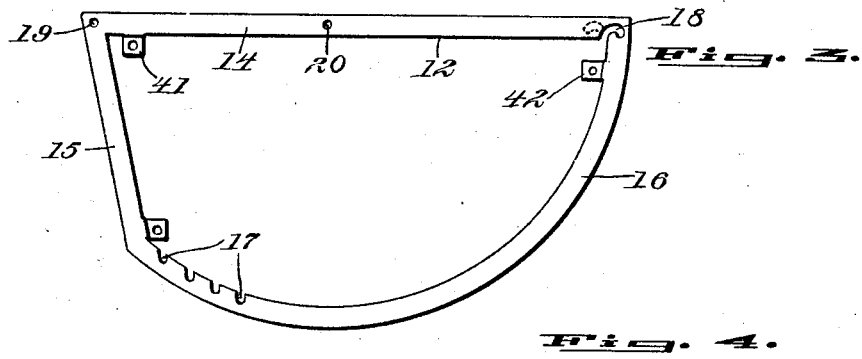
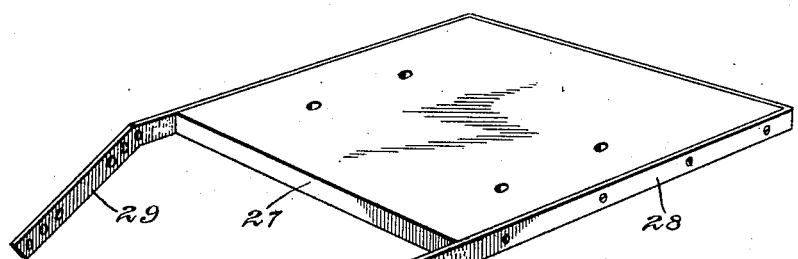
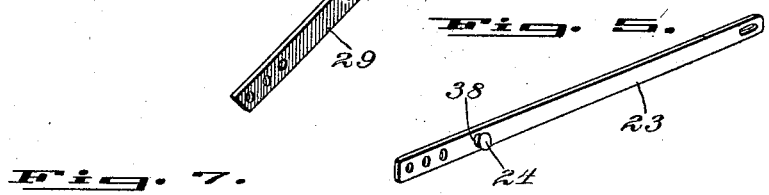
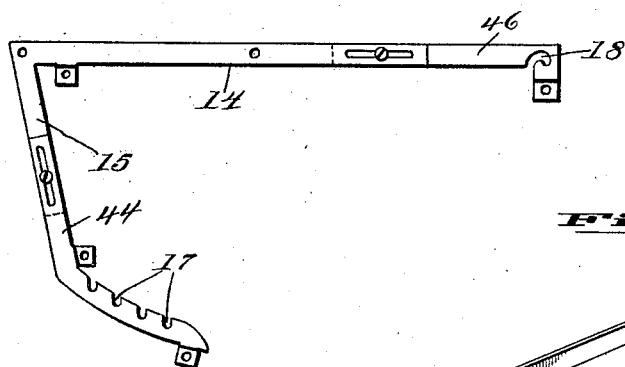
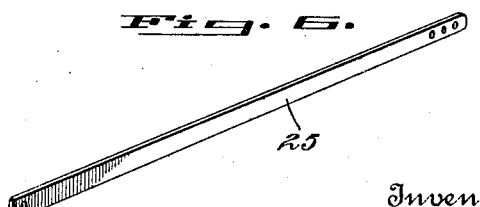
Inventor
S. H. Lemon
Witness
G. E. Logan Jr.
E. M. Springer
By Victor J. Evans
Attorney